April 29, 1958  D. C. HEITSHU  2,832,276
HITCH DEVICE

Original Filed March 22, 1952  3 Sheets-Sheet 1

INVENTOR.
D. C. HEITSHU
BY
Roger C. Johnson
ATTORNEY

April 29, 1958   D. C. HEITSHU   2,832,276
HITCH DEVICE
Original Filed March 22, 1952   3 Sheets-Sheet 2

FIG. 2

INVENTOR.
D. C. HEITSHU
BY Roger C. Johnson
ATTORNEY

FIG. 3

INVENTOR.
D. C. HEITSHU

United States Patent Office 2,832,276
Patented Apr. 29, 1958

2,832,276

HITCH DEVICE

Daniel C. Heitshu, Moline, Ill., assignor to Deere & Company, Moline, Ill., a corporation of Illinois Continuation of application Serial No. 278,031, March 22, 1952. This application June 6, 1956, Serial No. 591,253

23 Claims. (Cl. 97—46.07)

This invention relates to agricultural implements and more particularly to devices for connecting a ground-working or ground-contacting implement or the like to a tractor for maintaining the implement in a position generally parallel to the ground surface at different depths or positions of operation, irrespective of the pitch of the tractor as the latter passes over uneven terrain, as through swales, over ridges, or the like. This application is a continuation of copending application Ser. No. 278,031, filed March 22, 1952, now abandoned.

The object and general nature of the present invention is the provision of pitch-compensating mechanism for modifying conventional three-element draft linkage, plus means responsive to raising of the implement into a transport position for overriding the pitch-compensating mechanism and tilting the implement in a direction to facilitate lifting of the implement out of the ground. The invention finds general utility in the control of most ground-working implements and has even more pronounced advantages in cases of multiple-bottom plows, for example. It is also a feature of the invention to provide new and improved means for adjusting or modifying the pitch-compensating means in accordance with adjustments made in the hitch linkage to secure changes in the depth of operation. More specifically, it is a feature of the invention to provide means, generally in the form of a fluid motor deriving fluid under pressure from the lifting means of the tractor, for extending the upper or compression link in a conventional three-element hitch linkage whenever the implement is raised into its transport position, irrespective of the position of the pitch-compensating valve and/or other implement-position-responsive means.

Further and more detailed objects and features of this invention will be apparent to those skilled in the art after a consideration of the following detailed description, taken in conjunction with the accompanying drawings, in which.

The means chosen to illustrate the principles of the present invention is shown as a tractor and implement outfit which comprises a tractor 10, an implement 11, preferably in the form of a multi-bottom plow, and hitch linkage means including a pair of lower tension links 12 and 13 and an upper compression link 14 connecting the implement 11 with the rear portion of the tractor in draft-transmitting relation. The implement 11 may be substantially any of the conventional ground-engaging or ground-working types and for purposes of illustration is shown in the accompanying drawings as including a plow frame 15 equipped with standards carrying one or more plow bottoms (not shown) and a mast 16 to the upper portion of which the rear end of the upper link means 14 is pivotally connected. The frame 15 also carries a crossbar 17 to which the rear ends of the lower tension links 12 and 13 are pivotally connected. The forward ends of the links 12 and 13 are connected at 18 to laterally spaced apart points on the tractor.

The tractor 10 is conventional, so far as the present invention is concerned, and is provided with raising means in the form of a power lift, indicated in its entirety by the reference numeral 20. So far as the principles of the present invention are concerned the power lift mechanism may be any conventional hydraulic system operating with any type or source of hydraulic pressure, such as a pump or the like. A power lift mechanism of this character is shown in the U. S. Patent to Worstell, No. 2,477,710 issued August 2, 1949. For purposes of illustration, the tractor power lift mechanism 20 is shown as including a transverse rockshaft 21 supported at the rear of the tractor and having rearwardly extending arms 22 fixed to the ends thereof. The lift arms 22 are connected through adjustable links 24 with the draft links 12 and 13, as at 25. Carried within the body of the tractor is a power lift cylinder 27 within which a piston 28 is movable. The piston is connected with an arm 29 that is fixed to the central portion of the power lift rockshaft 21. Valve mechanism 30 controls the flow of fluid under pressure to the cylinder 27 from a hydraulic pump 31 or other suitable source of pressure fluid, and the valve 30 is under the combined control of a manually operated control member or lever 33 that is movable through two ranges, one constituting a depth-adjusting or working range and the other a lifting range including a full-raise position, and a follow-up linkage 34 interconnected between the control lever 33 and the arm 29 or some other part movable therewith. The pressure source includes a reservoir 42 and the pump is connected to a high-pressure line or conduit 43.

Figures 1, 4:
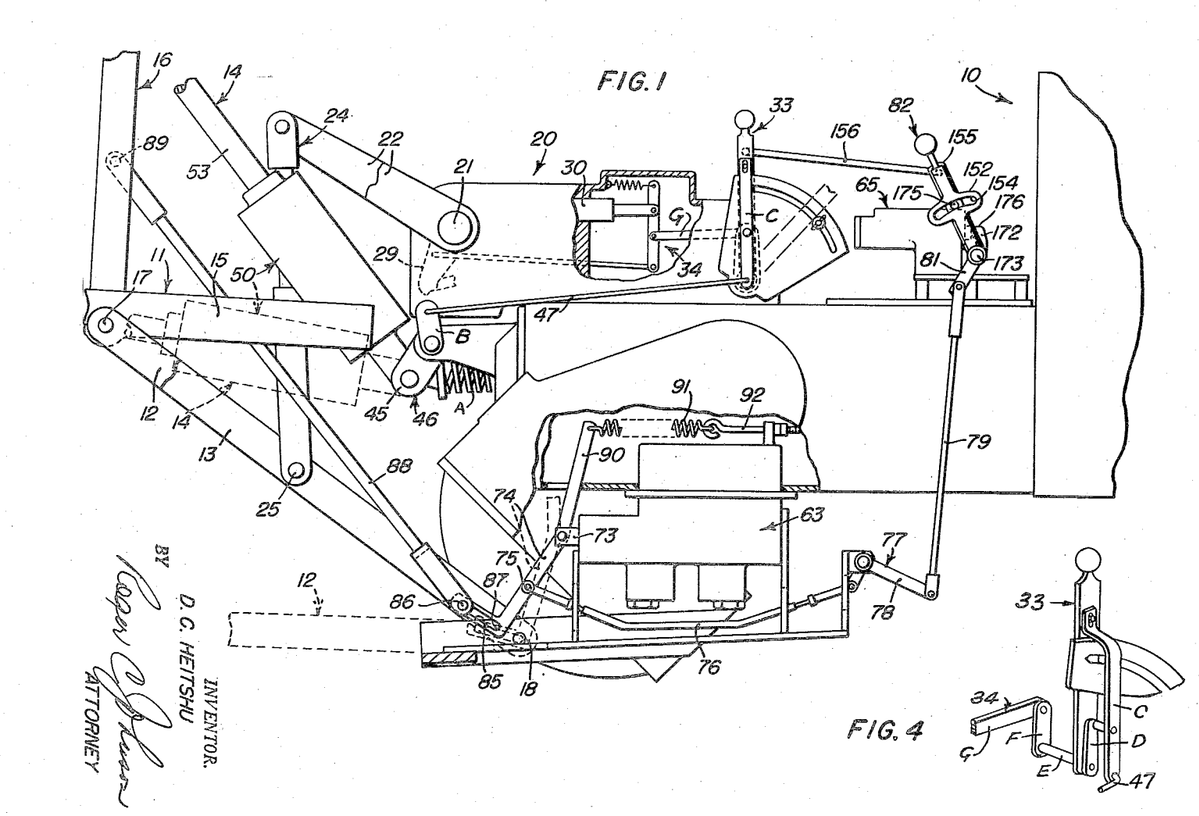
Figure 1 is a fragmentary side view showing the depth-adjusting means and the means responsive to operation of the implement raising means for modifying and/or overriding the pitch-compensating mechanism, the implement being shown in its raised or transport position.
Figure 4 is a fragmentary diagrammatic view, illustrating a portion of the load- or draft-control mechanism with which the present invention is associated.

The front end of the upper link 14 is connected with the movable bell crank portion 45 of a load- or draft-responsive mechanism 46 that includes a link 47 that connects with the follow-up linkage 34, whereby fluid from the pump 31 may be supplied to the cylinder 27 or fluid from the cylinder 27 permitted to exhaust to the reservoir 42. The present invention is not concerned with the particular details of the mechanism 46. It suffices, therefore, to note that the bell crank portion 45 acts against a load-resisting spring A, and when the thrust in the upper link 14 becomes sufficient to overcome the spring A an arm B, fixed to move with the part 45, shifts the link 47. As shown in Figure 4, the front end of link 47 is connected to the lower end of a lever C, the upper end of which is slotted and is fulcrumed on the hand lever 33, and when the latter is held stationary, as shown in Figure 1, the aforesaid movement of the lever C acts through an arm D on a shaft E to shift an arm F to which the link G, forming a part of the follow-up linkage 34 mentioned above, is connected. Thus, when the load on thrust link 14 becomes excessive the valve 30 is shifted to cause the power lift 20 to raise the implement. If, on the other hand, the thrust exerted in operation through link 14 against part 45 falls below normal, the spring A expands and, as a result, link 47 acts in the other direction through the follow-up linkage 34 to cause the valve 30 to permit oil to flow out of the cylinder 27. This provides for lowering of the implement.

It is a conventional characteristic of draft linkage such as that shown here, that the pair of lower links 12 and 13 and the upper link 14 are arranged in forwardly converging relation and provide a virtual pivot point well forward with respect to the tractor and about which the implement 11 may be considered to move vertically, as when the tractor and implement outfit passes over ridges or through swales or the like. In the case of relatively long implements, such as a three-bottom plow or the like, upward pitching of the tractor causes the implement to run nose up and hence to run out of the ground and vice versa and thus the implement does not hold to the proper depth of operation. In copending application Ser. No. 589,796, filed June 6, 1956, this problem has been solved by pitch-compensating means, preferably by incorporating in the upper link 14 adjusting means that includes a controllable hydraulic power unit, such as a hydraulic ram 50 that includes a cylinder 51 and a piston 52 connected through a rod 53 with the upper end of the implement mast 16, and suitable valve means to controllably direct fluid under pressure from a separate pump or the like, so as to extend or retract the two-way motor or ram unit 50. This serves to increase or decrease the effective length of the upper link 14 and thus to tilt the implement fore-and-aft about the transverse pivot at 17, whereby when, for example, the outfit travels through a depression or swale, the plow or other tool is kept from tending to run out of the ground at the front end, and when the outfit passes over a rise or ridge, the upper link means is automatically extended, which prevents the front end of the plow from running too deep.

It is one object of the present invention to provide new and improved mechanism, which responds to or is actuated by, first, the adjusting of the tractor power lift means to vary the depth or position of operation of the implement, and second, the operation of the tractor power lift means to raise the implement into a transport position, for changing or modifying the implement control effected by the pitch-compensating means 50. My new and improved control for a pitch-compensating means will now be described.

Figure 2:
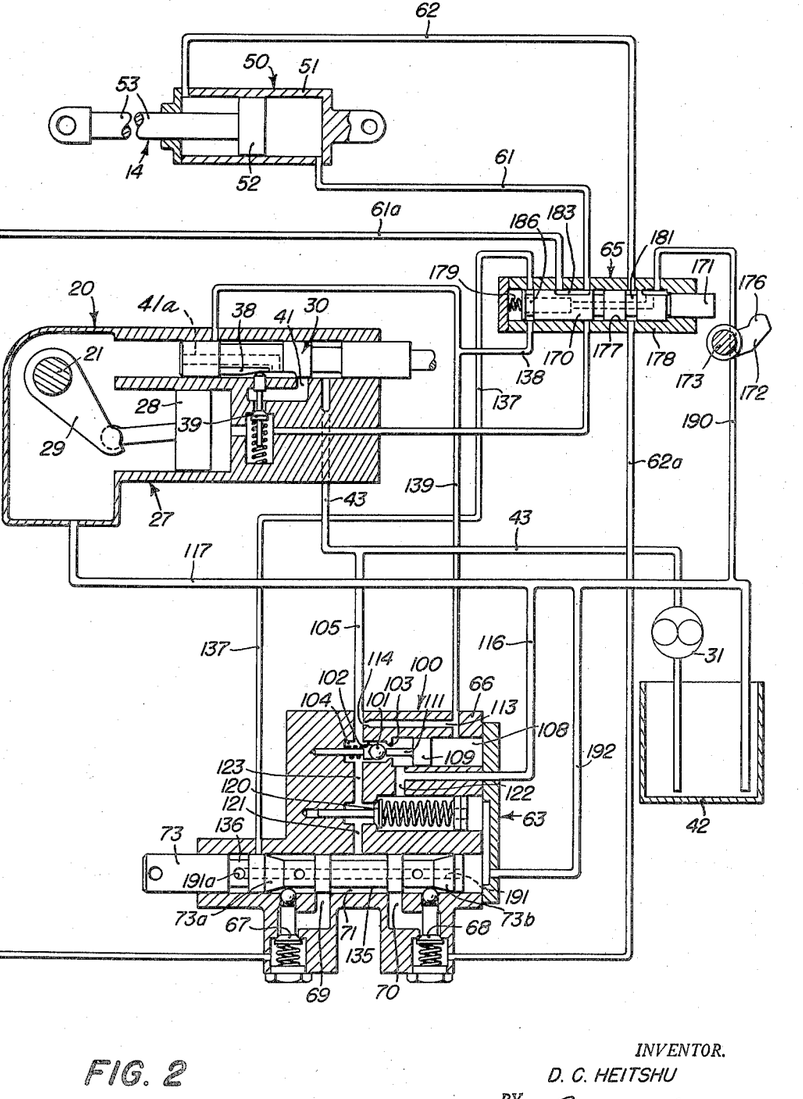
Figure 2 is a partly diagrammatic view showing the pitch-compensating valve and its relations and connections with the depth-adjusting means on the tractor and the pitch-compensating cut-out mechanism for overriding the pitch-compensating mechanism when the implement is to be raised into its transport position, the pitch-compensating valve and associated parts being shown in their normal or implement operating positions.

As shown in Figure 2, fluid conducting means including two pressure lines 61 and 62 lead from the front and rear ends of the cylinder 51 to a pitch cylinder control means or motor valve unit 63. Specifically, the pressure lines 61 and 62 lead into a lift-operated disabling part or shunt valve 65, which will be referred to below in detail, and are continued, as at 61a and 62a, from the shunt valve unit 65 to the pitch cylinder control valve unit 63, leading into the housing 66 of the valve unit 63 through check valves 67 and 68, the check valves 67 and 68 serving to control the flow of fluid from the lines 61a and 62a through ports 69 and 70 into the valve chamber 71 of the pitch cylinder control valve. The pressure lines 61 and 62, together with other associated fluid passages, constitutes means connecting the power unit 50 with the hydraulic mechanism of the tractor. Movable in the valve chamber 71 is a valve member 73 which, as will be explained below, forms the principal part of a first control means, or controllable means for operating the hydraulic unit 50. One end of the valve member 73 extends outwardly of the housing 63 and is pivotally connected to a lever 74 (Figure 1) that is pivotally connected, as at 75, to a shiftable fulcrum member, preferably in the form of a link 76 that is movable in a fore-and-aft direction. The link or member 76 is connected, at the end opposite the lever 74, with a bell crank 77, one arm 78 of which is connected through a link 79 with an arm 81 that forms a part of a second control means that includes an auxiliary manually operated control lever 82. Further and detailed reference to the auxiliary control lever 82 will be made below. The pitch cylinder control valve operating lever 74 has a slotted extension 85 at its lower end. The slot in the section 85 receives the front end pivot pin 86 of movable means in the form of a pitch cylinder control valve operating link member 88, the rear end of which is pivotally connected at 89 in any suitable way to the implement mast 16 at a point above the lower draft or tension links 12 and 13, whereby the link member 88 serves as means responsive to movement of the implement 16 relative to the lower links 12 and 13 to shift the valve lever 74 which, in turn, extends or retracts the ram 50, and the lever 74 constitutes means connected between the link member 88 and the valve 73. Above the rear end of the pitch cylinder control valve, the valve operating lever 74 is provided with an extension 90 to which one end of a spring 91 is connected, the other end of the spring 91 being anchored in any suitable way, as by an adjustable eye bolt 92, to an extension on the valve housing 63.

The pitch cylinder control valve housing 66 also carries a demand or unloading valve unit 100 which serves as a part of the tractor power lift system inasmuch as it functions, whenever the lift valve 30 is in its neutral position and no other demand is made upon the pump 31 of the hydraulic power lift system of the tractor for pressure fluid, to open the pressure line 43, leading from the pump 31 to the lift valve 30, to the reservoir.

The present invention is not concerned with the details of the demand valve means 100, and hence it will suffice to note that the demand valve unit 100 includes a ball valve 101 operating in a valve chamber 102 and pressed toward its valve seat 103 by a spring 104. The valve chamber 102 is connected through a pressure line 105 with the pressure line 43. Formed in the pitch cylinder control valve housing 66 is a cylinder 108 in which a piston 109 of relatively large area is movable, and a stem 111 on the piston 109 extends into the valve seat 103 in a position to engage the ball valve 101. A passage 113 leads from the cylinder 108 to the auxiliary pressure line 105 through an orifice 114.

When the power lift valve 30 is closed, and no other demand made upon the pressure system for fluid under pressure, the continued operation of the pump 31 builds up pressure in the pressure lines 43 and 105, and by virtue of the fluid under pressure flowing through the orifice 114, pressure is built up in the cylinder 108, which, acting against the relatively large piston 109, causes the latter to move into position unseating the ball valve 101, the latter being appreciably smaller in effective area than the piston 109. Therefore, the unseating of the ball valve 101 serves to reduce the pressure against which the pump 31 operates, since fluid may flow relatively freely past the open ball valve 101 and through a low pressure line 116 to a low pressure line 117 that leads from the sump of the cylinder 27 to the reservoir 42. Thus, when no demand is made upon the power lift system for fluid under pressure, the demand valve 101 serves as an unloading valve and is automatically opened, whereby the pressure line is relieved of the relatively high pressure which the pump is capable of furnishing when necessary.

A high-pressure relief valve 120 is also mounted within the pitch cylinder control valve housing 66 and communicates with the high-pressure line 105 through a port 123 and with the reservoir lines 116 and 117 through a port 122. The high-pressure line 105 is in communication with the pitch cylinder control valve chamber 71 through the ports 121 and 123.

In normal operating position, the position of the manual control lever 33, the pitch-compensating valve lever 74 and the upper and lower links 12, 13 and 14 are substantially as shown in dotted lines in Figure 1.

Whenever, as during operation over uneven terrain, the implement 11 swings about the axis defined by the member 17 relative to the rear ends of the draft links 12 and 13, the control valve link 88 is shifted in a generally fore-and-aft direction. For example, when the outfit passes through a depression or swale, the front end of the tractor pitches upwardly, relative to the general position of the implement, and this causes the link 88 to be pulled rearwardly. When the link 88 is moved rearwardly, the spring 91 acts to pivot the valve operating lever 74 about its connection at 75 with the fulcrum member 76 and pushes forwardly on the pitch cylinder control valve 73. The latter is then moved into a position (which is the same as the position of the valve 73 shown in Figure 3) in which the check valve 67 is opened by the left-hand camming surface 73a (Fig. 2) and the high-pressure port 121 in the pitch cylinder control valve housing 66 is placed in communication, by virtue of the annular chamber 135 in the body of the valve member 73, with the port 70 that leads past the check valve 68 into the line or passageway 62a leading through the shunt valve unit 65 (through port 181 therein, shunt valve 171 being in the position shown in Figure 2) and into the passageway 62 to the rear end of the pitch cylinder 51. At the same time, an annular chamber 136 in the rear portion of the valve 73 is moved into communication with a line or passageway 137 leading through the shunt valve unit 65 (through port 186, Figure 2) to a second line or conduit 139 into the pitch cylinder control valve housing 66 and communicates with the demand valve cylinder 108. As shown in Figure 2, the chamber 136 in the valve member 73 communicates through inner ports 191 and 191a with a reservoir conduit or exhaust line 192. This releases fluid from the demand valve chamber 108 faster than orifice 114 can supply fluid and the spring 104 then closes the demand valve 101. The pump 31 then forces fluid through the conduits 43, 105, 123 and 121 into the valve chamber 135 and thence through the port 70 and lines 62a and 62 into the rear end of the pitch-compensating cylinder 51. Fluid from the front end of the cylinder passes through the conduit 61, port 133 and conduit 61a, past the opened check valve 67 (see Figure 3) and through the port 69, valve bore 191, and conduit 192 to the reservoir 42.

Therefore, when the tractor and implement outfit passes through a depression or swale, power is applied to the upper link adjusting unit 50 to retract or shorten the same, whereupon the plow or other implement is tipped forwardly, or downwardly at the front end and upwardly at the rear end, so as to place the implement in substantially a level position relative to the surface of the ground. This movement of the implement shifts the link 88 forwardly which restores the valve 73 to its neutral or central position, which hydraulically locks the piston 52 in its new position in the cylinder 51 and blocks off any further flow of fluid from the demand valve cylinder 108. As a result, the depth or position of operation is maintained substantially uniform, particularly as between the front and rearmost bottoms thereof if the implement 11 is a multi-bottom plow.

The above condition obtains so long as the outfit is passing through a depression or swale, but when the outfit again reaches level ground the implement pivots relative to the draft links in the other direction and resulting movement of the pitch cylinder control valve 73 from its neutral or central position (Figure 2) in the rearward direction results in the closing of the demand valve 101, and the opening of the lines 61 and 61a to the pressure line from the pump 31, whereby fluid under pressure is directed to the front end of the pitch cylinder 51, thereby extending the upper link means 14 and restoring it to normal length. When the control valve 73 is moved rearwardly, the camming surface 73b acts to open the associated check valve 68, whereby fluid may flow from the rear end of the cylinder 51 through the lines 62 and 62a, past the check valve 68 and through the line 192 to the reservoir.

Substantially the reverse of the above described actions takes place when the outfit passes over a ridge or rise. That is, as the front end of the tractor drops when the tractor passes over the crest of the ridge or rise, the tools momentarily operate at reduced depth. This results in a decrease in draft and as a consequence thereof the valve 30 releases oil from the cylinder 27 and lowers the implement. As the implement thus lowers, a thrust is exerted through link 88, and as a result of this movement of link 88, the action of the pitch control cylinder and piston unit is first to extend the upper link means, and then as the tractor and implement outfit reaches level ground again the upper link means is shortened or brought back to its normal position.

As will be seen from the above description, the action of the automatic means for extending and retracting the upper link means 14 as the implement changes its position relative to the lower draft links 12 and 13, is, in effect, to cause the implement as a unit to swing relative to the tractor generally about a transverse axis. The parts are so constructed and arranged that this axis of pivoting lies in the position, relative to the tractor, that secures the optimum operation for the particular implement involved. For example, as is illustrated in Figure 1, the effective pivot axis, about which the pitch-compensating mechanism described above causes the implement 11 to swing relative to the tractor, lies substantially in the transverse line that extends through the pivots 18 and the point of pivotal connection of the pitch cylinder control rod 88 with the pitch cylinder control valve operating lever 74, which point lies normally at the forward end 87 of the slot in the portion 85 of the lever 74.

From the above description of the pitch-compensating mechanism, it will be seen that if the implement is displaced relative to the draft links 12 and 13 so that the front end of the valve controlling link 88 is shifted either forwardly or rearwardly, the pitch cylinder control valve is actuated so as to adjust the effective length of the upper link means 14 and restore the hitch parts to their normal positions so that the forward end of the link 88 is brought back into a position substantially coinciding with the aforesaid axis, or whatever axis is selected for best operation. With this in mind, it will be seen, therefore, that the implement operates in a level position substantially only at one depth of operation, yet the control lever 33 provides for different depths of operation, merely by shifting the control lever through its depth-adjusting range.

According to the principles of the present invention, I provide means for changing the relation between the link 88 and the valve 73 so that the implement may be operated in a level position, and normally maintained in that position, at widely different depths of adjustment. To effect this readjustment of the actuating mechanism for the pitch cylinder control valve 73, all that it is necessary to do is to adjust the effective length of the link 88 according to changes in the depth of operation. To this end, I provide means incorporated between the link 88 and the control valve 73 for bringing the latter back to its neutral position in different positions of the implement relative to the draft links 12 and 13, which corresponds to different positions of operating depth, and such means will now be described.

Mention was made above of the fact that the intermediate portion of the pitch cylinder control valve member 74 is pivotally connected at an intermediate point with a fulcrum member 76 that is capable of generally fore-and-aft shifting movement as a result of rocking of bell crank 77. The link 79 connects the forward portion of the bell crank arm 78 to the arm 81 on the auxiliary control lever member 82. The latter includes a transversely extended section 152 which is slotted at 154 and receives bolt means 175 which, when tightened, rigidly connects the auxiliary control lever 82 with a lever arm 155 that is connected through a link 156 with the power lift control lever 33.

In operation, whenever the tractor hydraulic lift control lever 33 is moved into different positions throughout its depth-adjusting or working range, for changing the depth of operation of the implement, through actuation of the lift valve 30 and the resultant movement of the piston 28 into different positions, raising or lowering the lower links 12 and 13, the operative connection between the pitch cylinder control valve 73 and the pitch cylinder control valve operating link 88 is changed proportionately, whereby the implement operates in a substantially level position at the selected depth. Thus, the present invention contemplates, in addition to adjusting the effective length of the upper link 14 for maintaining the implement in a position substantially parallel to the ground surface when the outfit passes through swales, over ridges or the like, the feature of means responsive to changes in the tractor-carried depth-adjusting mechanism for holding the implement in position generally parallel to the ground surface at different depths of operation, and to perform such adjustment automatically, since the interconnection between the pitch cylinder control valve link 88 and the pitch cylinder control valve 73 is automatically changed when the control lever 33 of the tractor is shifted to produce a change in the operating depth of the implement.

Shifting the control lever 33 is, however, not the only means for raising and lowering the implement. Mention was made above of the draft-responsive unit 46, conventional so far as the principles of the present invention are concerned. This unit provides for automatically controlled movements of the power lift valve 30 in response to changes in the load transmitted to the bell crank means 45 by the upper link means 14. Action of the lift valve 30 is therefore made responsive to variations in the draft of the implement and actuations of the valve 30, in one direction or the other, cause the piston 28 to be moved outwardly or inwardly, which results in raising and lowering movement transmitted through the lift arms 22 to the lower draft links 12 and 13. However, this movement does not cause any change in the position of the fulcrum member 76 and, further, the pitch cylinder control valve 73 is not made as sensitive to changes in the position of the pitch cylinder control valve link 88 as the lift valve 30 is sensitive to changes in the amount of draft or load imposed on the bell crank means 45. Therefore, within the limits just mentioned, when the draft-responsive mechanism of the tractor acts to raise and lower the implement, so as to compensate for increased or decreased soil resistance, the pitch-compensating unit 50 is not brought into action; instead, the implement as a whole moves, in response to changes in the draft, about a forward virtual pivot point that lies at the point of intersection of the lines extending forwardly through the upper and lower links 12, 13 and 14. While thus responding to changes in the draft, within the limits of the sensitivity of the pitch cylinder control valve, the implement is not theoretically exactly level at the momentarily new depth of operation. However, if the changes are such as to exceed the limits just mentioned, then the pitch-compensating mechanism comes into action and automatically pivots the implement about the pitch-compensating pivot point.

According to the principles of the present invention, as so far described, the implement moves generally as a unit about a generally transverse axis as the tractor pitches upwardly or downwardly when passing over ridges or rises, or through swales, depressions or the like, and also generally about said axis when the tractor power lift mechanism responds to changes in the amount of draft, except that the implement moves about the aforesaid virtual pivot point when the draft-responsive mechanism operates within the limits of insensibility of the pitch-compensating mechanism. However, a somewhat different action is desirable when lifting the implement into a transport position entirely out of contact with the ground. In order to facilitate lifting the implement, such as a plow or the like, into its transport position, it would be desirable not only to override or disable the pitch-compensating mechanism, whenever the control lever 33 is shifted into its implement transport position but actually to reverse the action of the motor 50 to extend the upper link means 14 immediately its maximum amount so as to tilt the implement rearwardly and thus cause the ground-working tools to run nose up and hence to run out of the ground more readily than merely raising the implement as a unit about some forward axis. According to the principles of the present invention, means to this end is provided, and such means will now be described.

Briefly, the pitch-compensator cut-out and reversing mechanism of the present invention, provided to facilitate lifting the implement into a transport position, comprises the shunt unit 65 mentioned above and associated fluid-conducting means directing the hydraulic pressure of the tractor power lift into the front end of the pitch-compensating unit 50 whenever the manual control lever 33 is moved into its transport or full-raise position, with lost-motion means connecting the shunt valve unit with the control lever 33, whereby movement of the latter does not move the shunt valve out of its normally inactive position (Figure 2) except when the control lever 33 is moved out of its depth-adjusting range and into its lifting or transport range.

Figure 3:
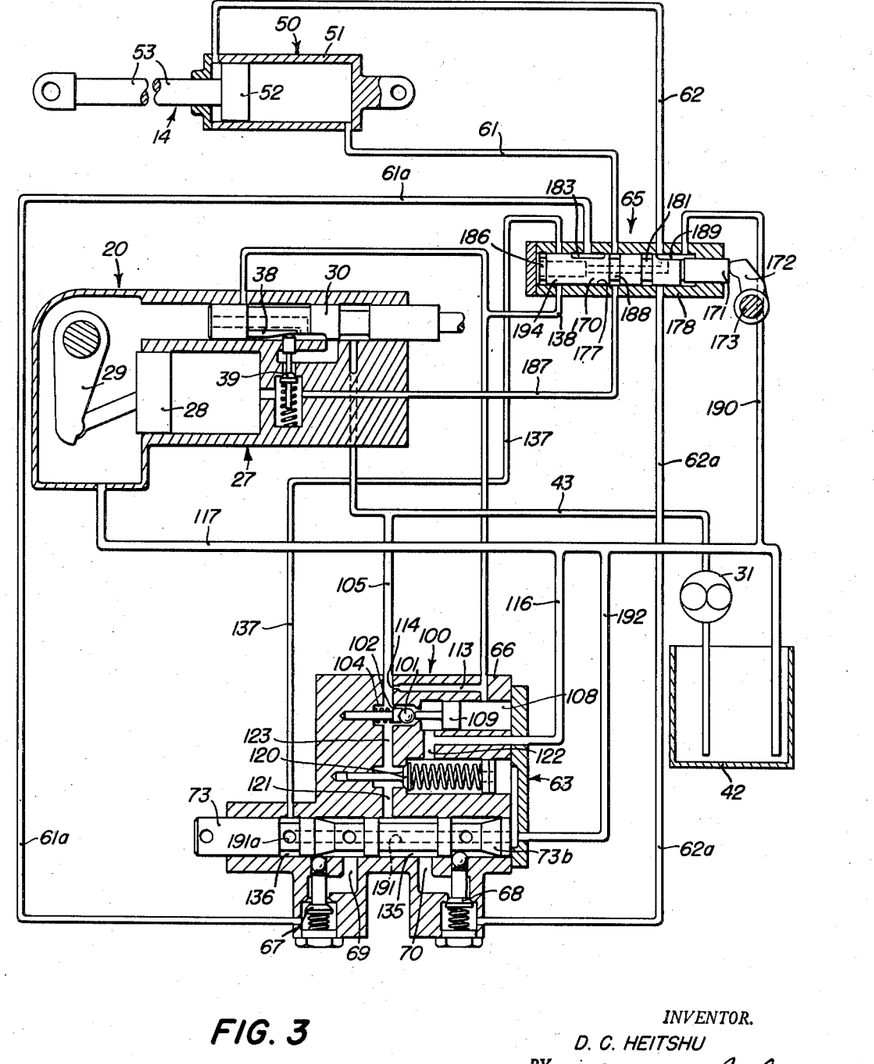
Figure 3 is a view similar to Figure 2, showing the valves and other parts in the positions they occupy when the implement is raised into its transport position.

Referring now to Figures 1 and 3, the shunt valve unit 65 includes a part in the form of a shiftable valve member 170 movable from one position to another and having a forward end 171 disposed in a position within the path of movement of an arm 172 that is mounted on a shaft 173 upon which the lever 82 is rockably mounted. The arm 82 is releasably connected, as by a bolt 175 or the like, to the arm 155, which is fixedly secured in any suitable way to the shaft 173. The parts are so arranged that the arm 172, with its rounded valve engaging portion 176, does not engage the end 171 of the valve 170 until the power lift valve control lever 33 of the tractor has been moved into its implement lifting or transport position, as shown in Figure 1. Thus, the lever 82, link 156, shaft 173 and valve-engaging portion 176 form a connection between or means connecting the lever 33 of the power lift or raising mechanism 20 and the movable valve 170 of the shunt valve unit 65, whereby when the implement is raised the motor valve unit 73 is disabled, since the lines 61a and 62a are cut off at 65 (Fig. 3).

The valve member 170 is disposed within a cylindrical chamber 177 formed in a valve body 178, and a spring 179 (see Fig. 2), acting against the closed end of the cylindrical chamber 177, serves to hold the valve 170 in a position in which an annular groove 181 in the valve 170 connects the two lines or passageways 62 and 62a. Further, the valve 170 is provided with a peripheral passageway 183 which, in the normal or operating position of the valve 170, interconnects the two passageways 61 and 61a. Thus, in the normal or operating position of the shunt valve unit 65, the two ports 69 and 70 are connected directly with the opposite ends of the pitch cylinder 51, subject, of course, to the two check valves 67 and 68. Further, the shunt valve 170 at its inner end includes a passageway 186 normally opening communication between the two demand valve lines 137 and 138 whereby release of the pressure within the demand valve chamber 108, either by operation of the lifting valve 30 or by operation of the pitch cylinder control valve 73, causes the demand valve 101 to close and establish pressure in the system.

In operation, whenever the tractor power lift valve control lever 33 is shifted into the implement raising or transport position, the arm 172 comes into engagement with the end 171 of the shunt valve 170 and moves the latter into a position, as shown in Figure 3, in which the demand valve lines 137 and 138 are separated or cut off, one from another, the line or passage 61a is likewise cut off or blocked, and the line 61 is connected directly to the inner end of the lift cylinder 27, between the latter and the check valve 39, as through a line or passageway 187 and an annular groove 188 (Figure 3) in the shunt valve member 170. At the same time, the line 62 from the other end of the pitch cylinder 51 is connected through a peripheral port 189 in the valve member 170 directly with a line 190 leading to the reservoir line 117 of the tractor power lift mechanism. Thus, the shunt valve unit 65, under the manual control of the lever 33, forms a manually controllable means connected between the unit 50 and the member 88 to render the latter inoperative. The passages or hydraulic lines 187 and 190 (Figure 3) constitute passage means for directing fluid to the unit 50 to extend the latter during implement lifting action.

The functioning of the shunt valve unit 65, when the valve member 170 is in the lift position (Figure 3), thus results in fluid under pressure being directed into the forward end of the pitch cylinder 51 whenever the lift valve 30 is operated to direct fluid under pressure into the inner end of the cylinder 27 to raise the implement independently of the pitch-compensating mechanism which, when the shunt valve 65 is in the position shown in Figure 3, is temporarily disabled since the lines 61a and 62a are blocked. At the same time, the raising of the implement toward or into its transport position causes the implement to swing relative to the rear ends of the lower links 12 and 13, with a resultant rearward movement of the link 88 and the forward movement of the valve 73 into the position shown in Figure 3. Continued lifting of the implement results in further rearward movement of the link 88, and this is readily accommodated since the pin 86 may move rearwardly in the slot 85 without further affecting the valve 73.

In the normal working position of the hydraulic units (Figure 2) the forward movement of the valve 73 would permit oil to flow from the demand valve cylinder 108 through the lines 139 and 138, the annular port 186 of the shunt valve member 170, the line 137, the groove or chamber 136 in the valve member 73, the valve bore 191a and 191, and the lines 192 and 117 to the reservoir 42, whereby closing of the lift valve 30, as when the implement reaches its raised position, would not result in opening the demand valve 101 and thus the pressure in the line 43 would not be relieved. To provide for releasing pressure in the line 43, the inner end 194 of the shunt valve member 170 closes off communication between the demand lines or passageways 137 and 138, as shown in Figure 3. Therefore, when the implement is raised, although the pitch cylinder control valve 73 is in a forward position and the line 137 opened through the chamber 136 and central bore 191 to the reservoir, fluid in the demand valve chamber 108 is not permitted to flow therefrom. Accordingly, when the valve control lever 33 is in a position to raise the implement, the front end of the pitch-compensating cylinder 51 is connected in parallel with the tractor power lift cylinder 27, and the power for lifting the implement is also used to extend the unit 50 in the upper link means 14. The upper link pitch-compensating unit 50 remains extended so long as the implement is in its transport position.

Stated otherwise, in typical operating conditions, the pitch-compensating motor is connected to the pressure source via first fluid-conducting means 61a—61 and 62a—62 under control of the motor valve 73, and the shunt valve 170, which is a third valve in addition to the lift valve 30 and motor valve 73, occupies its Fig. 2 position to establish said fluid-conducting means via 181 for 62a—62 and via 183 for 61a—61. But when the member or lever 33 is moved to its transport position, the shunt valve disables the motor valve 73 by cutting off the lines 61a—61 and 62a—62 (Fig. 3) and establishing a second fluid conducting means including 187—188—61 and 62—189—190, which second means connects the motor 50 to the tractor pressure source in parallel with the lift cylinder 27. In field operation (Fig. 2) the shunt valve cuts out the second fluid-conducting means and establishes the first means.

One further advantage, in addition to causing the implement to run out of the ground, of tipping the implement rearwardly, irrespective of the position of the pitch cylinder control valve 73 when the implement is to be raised into its transport position, is that in tipping the implement rearwardly while raising the same, the implement is raised generally parallel to the ground and no energy need be expended in the raising operation to lift the rear end of the implement higher than the front end, as would be the case if the implement were raised as a unit about an axis on or adjacent to the tractor. As soon as the depth control lever 33 is moved out of its implement-raising position and into its depth-adjusting range, the shunt valve member 70 is returned to its normal operating position, as shown in Figure 2, and just as soon as the port 186 in the shunt valve opens communication between the lines 137 and 138, pressure rises in the system and fluid is directed through the port 70 and lines 62a and 62 to the rear end of the cylinder 51. This retracts the unit 50 and tips the implement forwardly, or downwardly at its forward end, thus materially aiding entry of the tools into the ground, as in the case of a plow, when the implement is lowered into operating position, which is accomplished by swinging the hand lever 33 downwardly and forwardly, as to or beyond the dotted-line position shown in Figure 1. This movement of the lever 33 moves the valve 30 forwardly beyond the position shown in Figures 2 and 3, causing a cam section 28 on the valve 30 to open the check valve 39, whereupon fluid flows out of the cylinder 27 through a port 41 (Figure 2) and through a central port 41a in the rear end of the valve 30 to the sump in the power lift casing and into the lower pressure line 117.

While I have shown and described above the present invention as incorporated in a particular tractor hydraulic power lift system, it is to be understood that the principles of the present invention, wherein a pitch-compensating mechanism is adjusted for different depths of operation and/or by-passed or cut-out when the implement is to be raised into a transport position, may be incorporated in or associated with different kinds of power-actuated implement raising and adjusting means.

Accordingly, what I claim and desire to secure by Letters Patent is:

1. For use with a tractor and implement outfit, wherein the implement is connected by upper and lower link means with the tractor at generally vertically spaced apart points, and wherein one of said link means includes adjusting means for increasing and decreasing the effective length thereof: the combination with means for raising said implement relative to the tractor, and means responsive to movement of the implement relative to the other of said link means for operating said adjusting means, of a part movable from one position to another to disable said responsive means and a connection between said raising means and said part for shifting the latter to its disabling position in response to a given movement of said raising means for disabling said responsive means.

2. For use with a tractor and implement outfit, wherein the implement is connected with the tractor by upper and lower link means and the tractor has hydraulic lift means connected with said lower link means for raising and lowering said implement: the improvement comprising the combination with a piston and cylinder unit in the upper link means for changing the effective length thereof, and hydraulic means responsive to changes in the position of the implement relative to said lower link means for operating said piston and cylinder unit to change the length of said upper link means, of shiftable shunt valve means operatively interposed between said hydraulic implement position-responsive means and movable into one position for blocking fluid flow therefrom to said piston and cylinder unit, said shunt valve means including passage means adapted, in said one position of said shunt valve means, to place said piston and cylinder unit in operative connection with said hydraulic lift means whereby fluid from the latter is directed to said piston and cylinder unit to extend said upper link means whenever said hydraulic means raises said implement, and means connected with said shunt valve means for shifting the latter into said one position when said hydraulic lift means is operated to raise the implement.

3. For use in connecting a ground-working implement to a tractor, the improvement comprising link means adapted to be pivotally connected at its ends with said implement and tractor, respectively, for vertical adjustment of the implement relative to the tractor and for fore-and-aft tilting of the implement relative to the tractor so as to normally incur the tendency of the implement to run nose up when the front of the tractor pitches upwardly, first power means connected between the tractor and the implement for adjusting the implement vertically and including a control member movable to a full-raise position for causing the first power means to raise the implement to a transport position, second power means independent of the first power means and connected between the tractor and the implement for tilting the implement fore-and-aft, controllable means connected to the second power means independently of the first power means, signal means connected to the controllable means and operative in response to pitching of the tractor relative to the implement for actuating the second power means to forcibly tilt the implement in the corrective direction to compensate for said nose-up tendency and means responsive to movement of the aforesaid control member to its full-raise position for disabling the controllable means upon raising of the implement to its transport position.

4. For use with a tractor and implement outfit, wherein the implement is connected with the tractor by upper and lower link means and the tractor includes hydraulic means, acting through the lower link means, for raising the implement to different operating positions and into a raised transport position, and a manually shiftable part for operating said lift means: the improvement comprising the combination with a hydraulic unit in said upper link means, and controllable means for operating said hydraluic unit, of valve means operative in one position for directing a flow of fluid from said hydraulic means to said hydraulic unit for extending said upper link means, and means connected with said manually shiftable part and with said valve means for shifting said valve means into said one position when said manually shiftable part is moved into a position corresponding to the transport position of said implement.

5. The invention defined in claim 4, further characterized by yieldable means connected with said valve means for holding said valve means out of said one position, and said last-named shifting means including lost-motion means accommodating movement of said manually shiftable part into different positions corresponding to different operating positions of said implement.

6. For use with a tractor and implement outfit, wherein the implement is connected with the tractor at vertically spaced points by upper and lower link means, wherein the tractor has hydraulic lift means connected with said lower link means for raising and lowering said implement and said hydraulic means includes a control lever operative through two ranges, one for controlling the depth of operation of the associated implement and the other constituting an implement-lifting range, and wherein said upper link means includes a piston and cylinder unit for extending and retracting said upper link means: the improvement comprising the combination with a first control valve movable in response to changes in position of the implement relative to said lower link means, and passages leading from said first valve to said piston and cylinder unit, of a shunt valve incorporated in said passages and adapted in one position to close off communication between said first valve and said piston and cylinder unit, means connecting said shunt valve with said control lever whereby movement of the latter into its implement-raising position shifts said shunt valve into a position shutting off communication between said first valve and said piston and cylinder unit, and connections controlled by said shunt valve for establishing communication between said hydraulic means and said piston and cylinder unit for extending the latter whenever said control lever is moved into its implement-raising position, irrespective of the position of said first valve.

7. For use with a tractor and implement outfit, wherein the implement is connected with the tractor through means including link means having a double-acting piston and cylinder unit, whereby operation of the latter unit serves to extend or retract said link means, a source of fluid pressure having high and low pressure sides, and a pitch control valve and a pair of conduits extending therefrom respectively to opposite sides of the cylinder of said unit for controlling extension and retraction of said link means: the combination with said valve, conduits and piston and cylinder unit of a shunt valve for controlling said conduits and including a first pair of passages connected respectively to the conduits when the shunt valve is in one position and a second pair of passages disposed, when said shunt valve is in a second position, between the high and low pressure sides of said source of fluid pressure and opposite sides of said piston and cylinder unit and providing for a flow of fluid to said piston and cylinder unit in a direction to cause said link means to tilt the implement rearwardly.

8. For use with a tractor and implement outfit, wherein the implement is connected with the tractor through upper and lower link means, the upper link means including a piston and cylinder unit operative to increase or decrease the effective length of said upper link means, the tractor having a controllable hydraulic raising and lowering means connected with said link means for raising and lowering the implement to change the operating depth thereof, and a control lever operatively connected with said hydraulic raising and lowering means and operative through one range of movement to change the depth of operation of said implement and operative through another range to raise the implement into a transport position: the combination with means responsive to the position of the implement relative to said link means and operatively connected with said piston and cylinder unit for operating the latter to increase or decrease the effective length of said upper link means, of valve means interconnected between said position-responsive means and said piston and cylinder means, means biasing said valve means for movement into a position accommodating flow of hydraulic fluid between said piston and cylinder means and said position-responsive means, and lost-motion means connected between said valve and said control lever, said lost-motion accommodating movement of the latter through said depth-adjusting means without moving said valve, movement of said control lever into said implement-raising position shifting said valve in a position terminating control of said piston and cylinder means by said implement-responsive means, and means operative in said second position of said valve for establishing communication between said implement raising and lowering means and said piston and cylinder means for operating the latter to extend said upper link means when said implement is raised into its transport position.

9. For use with a tractor and implement outfit, wherein the implement is connected with the tractor by upper and lower link means and the tractor has hydraulic means connected with said link means for raising and lowering said implement: the improvement comprising the combination with a piston and cylinder unit in said upper link means, of a first means including a movable part connected with said lower link means and responsive to changes in the position of the implement relative to said lower link means for operating said piston and cylinder unit to extend or retract said upper link means, means connected with and deriving energy from said tractor hydraulic means for extending said upper link means, and manually controllable means connected between said piston and cylinder unit and said responsive means for rendering said implement-responsive means inoperative so as to provide for extension of said link means by energy derived from said tractor hydraulic means independent of changes in the position of the implement relative to said lower link means.

10. For use with a tractor and implement outfit, wherein the implement is connected with the tractor by upper and lower link means and the tractor includes hydraulic lift means connected with said lower link means for raising and lowering said implement, with a manually operable control lever movable into an implement raising position: the improvement comprising the combination with a double acting piston and cylinder unit in the upper link means and adapted to be extended and retracted for changing the effective length of said upper link means, a first control means connected with said piston and cylinder unit and operative to direct fluid under pressure optionally to either end of the cylinder of said piston and cylinder unit and optionally to withdraw fluid from the opposite end of said cylinder, of a shunt valve connected with said unit and adapted to direct fluid under pressure into one end of said cylinder so as to extend said piston and cylinder unit and thereby increase the effective length thereof, means connected with said shunt valve for withdrawing fluid from the other end of said cylinder, a second control means connected to the shunt valve, and means connecting said second control means with said manually operable control lever whereby said second control means is operated by movement of said control lever into its implement-raising position for shifting said shunt valve to cause the latter to extend said upper link means, irrespective of the position of said first control means.

11. For use with a tractor and implement outfit, wherein the implement is connected with the tractor by upper and lower link means and the tractor includes hydraulic lift means connected with said lower link means for raising and lowering said implement and a manually operable control lever movable into different positions to raise and lower said implement into different positions: the improvement comprising the combination with a piston and cylinder unit in said upper link means and operable to extend and retract the same, a valve connected with said piston and cylinder unit for controlling the flow of fluid under pressure to said piston and cylinder unit, and means connected with said implement and said valve responsive to a change in the position of said implement relative to said lower link means for operating said valve, a shiftable means connected between said valve and said position-responsive means for varying the relation therebetween, and a connection between said control lever and said shiftable means, whereby the position of said valve is controlled by the position of said control lever as well as by the position of said implement relative to said lower link means.

12. For use with a tractor and implement outfit, wherein the implement is connected with the tractor by upper and lower link means and the tractor includes hydraulic lift means connected with said lower link means for raising and lowering said implement, and a manually operable control lever movable into different positions to raise and lower said implement into different positions: the improvement comprising the combination with a piston and cylinder unit in one of said upper and lower link means and operable to extend and retract the same, a valve connected with said unit for controlling the flow of fluid under pressure to said unit, and means connected between the implement and the tractor and responsive to a change in the position of said implement relative to one of said link means for operating said valve, of shiftable means connected between said valve and said position-responsive means for varying the relation therebetween, and a connection between said control lever and said shiftable means, whereby the position of said valve is controlled by the position of said control lever as well as by the position of said implement relative to said lower link means.

13. The invention set forth in claim 12, further characterized by said implement position-responsive means including a lever connected with said valve, a member serving as a shiftable fulcrum for said lever, and means operatively connecting said fulcrum with said control lever, whereby movement of the latter to raise or lower said implement into different positions serves to shift said valve-operating lever.

14. For use with a tractor and implement outfit, wherein the implement is connected with the tractor at generally vertically spaced points thereon by upper and lower link means, and wherein the upper link means is extensible and retractable and the tractor is provided with hydraulic mechanism connected with said link means for raising and lowering said implement, said hydraulic mechanism including a control lever, the combination with a controllable hydraulic power unit connected with the upper link means for extending and retracting said upper link means, movable means responsive to movement of the implement relative to said lower link means, means connecting said hydraulic power unit with the hydraulic mechanism of the tractor for operating said power unit, including controllable valve means, and means connecting said controllable valve means with said movable means, whereby said valve means is shifted in response to movement of the implement relative to said lower link means for controlling said hydraulic power unit, of a shunt valve incorporated in said first mentioned connecting means and movable into a position to cut off communication between said valve means and said power unit, means connected with said control lever and said shunt valve means for moving the latter, when the implement is lifted by said hydraulic mechanism into said position, and passage means operative by said shunt valve when in said one position for diverting some of the hydraulic fluid from said hydraulic mechanism during implement lifting action and directing the diverted fluid under pressure to said upper link means for extending the latter irrespective of the position of the implement relative to said lower link means.

15. For use with a tractor having a power source, a power lift operated by said source and vertically adjustable draft linkage connected to said lift and adapted to connect a ground-working implement to the tractor for relative vertical movement by the power lift and said linkage including a transverse pivot about which the implement is tiltable fore-and-aft so as to normally incur the tendency of the implement to run nose up when the front end of the tractor pitches upwardly, and said tractor haivng a control member for the power lift operative through a working range to cause the lift to adjust the implement vertically and said member being movable to a full-raise position to cause the lift to raise the implement to a transport position: pitch-compensating mechanism comprising a tractor-power-source-operated device additional to the power lift and connected between the tractor and implement for forcibly tilting the implement about the aforesaid transverse pivot; control means actively positionable to connect said device to the tractor power source and operative in response to upward pitching of the tractor to incur forward tilting of the implement and consequent nose-down operation thereof to correct the aforesaid nose-up tendency; a part movable from one position to another to disable said control means; and a connection between said part and the power lift control member for shifting said part to its disabling position in response to movement of said member to its full-raise position whereby to avoid the aforesaid corrective nose-down operation of the implement during raising of the implement to its transport position.

16. The invention defined in claim 15, in which: the tractor power source includes a fluid pressure source; the power-operated device is a two-way fluid motor and the control means includes fluid-conducting means between the pressure source and said motor and a motor valve actively positionable to selectively establish and interrupt said fluid-conducting means; and the disabling part comprises an additional valve operative in its disabling position to interrupt said fluid-conducting means irrespective of the position of the motor valve.

17. For use with a tractor having a power source, a power lift operated by said source and vertically adjustable drift linkage connected to said lift and adapted to connect a ground-working implement to the tractor for relative vertical movement by the power lift and said linkage including a transverse pivot about which the implement is tiltable fore-and-aft so as to normally incur the tendency of the implement to run nose up when the front end of the tractor pitches upwardly and nose down when the front end of the tractor pitches downwardly, and said tractor having a control member for the power lift operative through a working range to cause the lift to adjust the implement vertically and said member being movable to a full-raise position to cause the lift to raise the implement to a transport position: pitch-compensating mechanism comprising a tractor-power-source-operated device additional to the power lift and connected between the tractor and implement for forcibly tilting the implement selectively forwardly or rearwardly about the aforesaid transverse pivot; control means shiftable selectively to active positions at opposite sides of a neutral position for connecting said device to the tractor power source to incur tilting of the implement, said means being shiftable to one active position in response to upward pitching of the tractor to incur corrective forward tilting of the implement and consequent nose-down operation thereof and shiftable to its other active position in response to downward pitching of the tractor to incur corrective rearward tilting of the implement and consequent nose-up operation thereof; a part movable from one position to another to disable said control means; a connection between said part and the power lift control member for shifting said part to its disabling position in response to movement of said member to its full-raise position whereby to avoid the aforesaid corrective tilting of the implement; and additional means operative in response to movement of said control member to its full-raise position for connecting said device to the tractor power source to incur rearward tilting of the implement and consequent nose-up operation thereof incident to raising of the implement to its transport position.

18. The invention defined in claim 17, in which: the tractor power source includes a fluid pressure source, the power lift is a hydraulic unit having a lift valve controlled by the control means; the power-operated device is a two-way fluid motor and the control means includes first fluid-conducting means between the pressure source and said motor and a motor valve actively positionable to selectively establish and interrupt said fluid-conducting means; the additional means includes second fluid-conducting means connecting the lift unit to the motor; and the disabling part comprises a third valve normally cutting out the second fluid-conducting means and establishing the first fluid conducting means while the control member operates in its working range, said third valve in its disabling position cutting out the first fluid-conducting means and establishing the second fluid-conducting means.

19. For use with a tractor and implement outfit wherein the implement is connected with the tractor by articulate hitch linkage enabling both vertical adjustment as well as fore-and-aft tilting of the implement relative to the tractor and the tractor includes hydraulic means acting through said linkage for adjusting the implement vertically to different operating positions and to a raised transport position, and a manually shiftable part for controlling said hydraulic means: the improvement comprising a hydraulic unit connected with the linkage for tilting the implement selectively fore-and-aft, controlling means for operating said unit, valve means operative in one position to direct fluid from the hydraulic means to said unit for causing the linkage to tilt the implement rearwardly, and means connected with said manually shiftable part and said valve means for incurring said one position of said valve means when said manually shiftable part is shifted to a position corresponding to the transport position of said implement.

20. For use with a tractor and implement outfit wherein the implement is connected with the tractor by articulate hitch linkage enabling both raising and lowering as well as fore-and-aft tilting of the implement relative to the tractor and the tractor includes hydraulic means acting through said linkage for raising and lowering the implement, and wherein said lift means includes a control lever operative through two ranges, one for controlling the depth of operation of the associated implement and the other constituting an implement-lifting range, and wherein said linkage upper link means includes a piston and cylinder unit for tilting the implement selectively forwardly and rearwardly: the improvement comprising the combination with a first control valve movable in response to changes in position of the implement relative to said linkage, and passages leading from said first valve to said piston and cylinder unit, of a shunt valve incorporated in said passages and adapted in one position to close off communication between said first valve and said piston and cylinder unit, means connecting said shunt valve with said control lever whereby movement of the latter into its implement-raising position shifts said shunt valve into a position shutting off communication between said first valve and said piston and cylinder unit, and connections controlled by said shunt valve for establishing communication between said hydraulic means and said piston and cylinder unit for operating said unit to tilt the implement rearwardly whenever said control lever is moved into its implement-raising position, irrespective of the position of said first valve.

21. For use with a tractor and implement outfit wherein the implement is connected with the tractor by articulate hitch linkage enabling both raising and lowering as well as fore-and-aft tilting of the implement relative to the tractor, said linkage including a piston and cylinder unit operative to tilt the implement selectively forwardly and rearwardly, the tractor having a controllable hydraulic raising and lowering means connected with said linkage for raising and lowering the implement to change the operating depth thereof, and a control lever operatively connected with said hydraulic raising and lowering means and operative through one range of movement to change the depth of operation of said implement and operative through another range to raise the implement into a transport position: the combination with means responsive to the position of the implement relative to said linkage and operatively connected with said piston and cylinder unit for operating the latter to incur fore-and-aft tilting of the implement, of valve means interconnected between said position-responsive means and said piston and cylinder means, means biasing said valve means for movement into a position accommodating flow of hydraulic fluid between said piston and cylinder means and said position-responsive means, and lost-motion means connected between said valve and said control lever, said lost-motion accommodating movement of the latter through said depth-adjusting means without moving said valve, movement of said control lever into said implement-raising position shifting said valve in a position terminating control of said piston and cylinder means by said implement-responsive means, and means operative in said second position of said valve for establishing communication between said implement raising and lowering means and said piston and cylinder means for operating the latter to cause said linkage to tilt the implement rearwardly when said implement is raised into its transport position.

22. For use with a tractor and implement outfit wherein the implement is connected with the tractor by articulate hitch linkage enabling both raising and lowering as well as fore-and-aft tilting of the implement relative to the tractor and the tractor includes hydraulic means acting through said linkage for raising and lowering said implement: the improvement comprising the combination with a piston and cylinder unit connected with the linkage for tilting the implement selectively fore-and-aft, of a first means including a movable part connected with said linkage and responsive to changes in the position of the implement relative to said linkage for operating said piston and cylinder unit to incur selectively tilting of the implement, means connected with and deriving energy from said tractor hydraulic means for operating said unit, and manually controllable means connected between said piston and cylinder unit and said responsive means for rendering said implement-responsive means inoperative so as to provide for operation of said unit by energy derived from said tractor hydraulic means independent of changes in the position of the implement relative to said linkage.

23. For use with a tractor and implement outfit, wherein the implement is connected with the tractor by hitch linkage and the tractor includes hydraulic lift means connected with said linkage for raising and lowering said implement and a manually operable control lever movable into different positions to raise and lower said implement into different positions: the improvement comprising the combination with a piston and cylinder unit connected with said linkage, a valve connected with said piston and cylinder unit for controlling the flow of fluid under pressure to said piston and cylinder unit, and means connected with said implement and said valve responsive to a change in the position of said implement relative to said linkage for varying the relation therebetween, and a connection between said control lever and said shiftable means, whereby the position of said valve is controlled by the position of said control lever as well as by the position of said implement relative to said linkage.

References Cited in the file of this patent

UNITED STATES PATENTS

| | | |
|---|---|---|
| 2,455,727 | Bunting | Dec. 7, 1948 |
| 2,721,508 | Edman | Oct. 25, 1955 |
| 2,754,738 | Brown | July 17, 1956 |
| 2,755,721 | Rusloni | July 24, 1956 |

FOREIGN PATENTS

| | | |
|---|---|---|
| 1,075,023 | France | Oct. 12, 1954 |